US011436467B2

(12) United States Patent
Cotter et al.

(10) Patent No.: US 11,436,467 B2
(45) Date of Patent: Sep. 6, 2022

(54) FOLDABLE RFID TAG HAVING AN ADHESIVE REGION AND AN EXTENSION REGION

(71) Applicants: AssetVue, LLC, Paoli, PA (US); Vanguard Identification Systems, Inc., West Chester, PA (US)

(72) Inventors: Sean Wm. Cotter, Paoli, PA (US); Alan J. Neves, West Chester, PA (US); John Lindquist, West Chester, PA (US); Greg Sawka, West Chester, PA (US); Richard O. Warther, West Chester, PA (US)

(73) Assignees: VANGUARD IDENTIFICATION SYSTEMS, INC, West Chester, PA (US); ASSETVUE, LLC, Paoli, PA (US)

( * ) Notice: Subject to any disclaimer, the term of this patent is extended or adjusted under 35 U.S.C. 154(b) by 0 days.

(21) Appl. No.: 16/942,090

(22) Filed: Jul. 29, 2020

(65) Prior Publication Data

US 2021/0042598 A1 Feb. 11, 2021

Related U.S. Application Data

(60) Provisional application No. 62/883,962, filed on Aug. 7, 2019.

(51) Int. Cl.
*G06K 19/077* (2006.01)
*G06K 19/06* (2006.01)
*G06K 19/07* (2006.01)
*G06K 19/02* (2006.01)

(52) U.S. Cl.
CPC ....... *G06K 19/0776* (2013.01); *G06K 19/025* (2013.01); *G06K 19/06028* (2013.01); *G06K 19/0723* (2013.01)

(58) Field of Classification Search
CPC ......... G06K 19/07726; G06K 19/0776; G06K 19/025; G06K 19/0723; G09F 3/10; G09F 3/0335; G09F 3/0288; G09F 3/02883; G09F 3/0297; G09F 2003/0254
USPC ..... 235/487, 488, 489, 492, 494; 340/572.1, 340/572.8
See application file for complete search history.

(56) References Cited

U.S. PATENT DOCUMENTS

| | | | |
|---|---|---|---|
| 2007/0145150 A1* | 6/2007 | Barczyk | G09F 3/10 235/492 |
| 2010/0085166 A1* | 4/2010 | Speich | G06K 19/07749 340/10.51 |
| 2017/0161601 A1* | 6/2017 | Sevaux | G06K 19/07722 |
| 2020/0002042 A1* | 1/2020 | Christman | B65C 1/02 |

* cited by examiner

*Primary Examiner* — Suezu Ellis
(74) *Attorney, Agent, or Firm* — Panitch Schwarze Belisario & Nadel LLP

(57) ABSTRACT

An asset identification tag having an adhesive region proximate a first end of the tag that has an adhesive disposed on at least a portion of a surface thereof, an extension region proximate a second end of the tag that has a radio-frequency identification (RFID) transponder disposed within the extension region, and an indicator disposed between the extension region and the adhesive region.

20 Claims, 9 Drawing Sheets

FOLDABLE RFID TAG HAVING AN ADHESIVE REGION AND AN EXTENSION REGION

CROSS-REFERENCE TO RELATED APPLICATIONS

The present application claims the benefit of U.S. Provisional Patent Application No. 62/883,962, filed on Aug. 7, 2019 and titled "RFID Asset Tracking Tag," the entire contents of which are incorporated herein by reference in their entirety.

BACKGROUND OF THE INVENTION

Embodiments of the present invention are generally directed to asset tracking tags, and more particularly, to asset tracking tags combining radio frequency identification (RFID) tags and visual codes.

Tags or labels for identifying assets are generally known. In some embodiments, such tags can be configured to display a visual code and/or contain an RFID transponder to uniquely identify the tag, which in turn uniquely identifies the asset marked with the tag. However, in some environments, the assets to be identified can be closely clustered, leaving space at a premium, such as where the assets are arrays of servers in modern data centers. In such environments, the asset tags must be compact, able to be placed between and/or adjacent to servers that may be separated only by 10-15 mils. At smaller sizes, however, tags may fall below a necessary level of rigidity or integrity, or they may be placed so close to the assets that interference with the tag's RFID signal results.

Accordingly, there is a need for tags thin enough to be placed between tightly-spaced assets, yet strong enough to retain their structural integrity. Similarly, there is a need for a way to determine whether the RFID transponder in the tag is placed sufficiently far from the asset to reduce the interference caused by proximity to the asset without making the tag itself too large.

BRIEF SUMMARY OF THE INVENTION

In one aspect, an embodiment of the present invention is directed to an asset identification tag having an adhesive region proximate a first end of the tag that has an adhesive disposed on at least a portion of a surface thereof, an extension region proximate a second end of the tag that has a RFID transponder disposed within the extension region, and an indicator disposed between the extension region and the adhesive region.

In another aspect, an embodiment of the present invention is directed to an asset identification tag having an adhesive region proximate a first end of the tag that has an adhesive disposed on at least a portion of a surface thereof, an extension region proximate a second end of the tag having a RFID transponder disposed within the extension region, and a transition region disposed between the adhesive region and the extension region that is visually distinct from the extension region and the adhesive region.

In another aspect, an embodiment of the present invention is directed to a method for making an asset identification tag, including the steps of applying a visual code to a first surface of the tag, placing an RFID transponder storing unique information on to a second surface of the tag opposite the visual code on the first surface, applying an adhesive material to the second surface of the tag at a location distinct from the RFID transponder, and verifying that at least some of the unique information stored in the RFID transponder corresponds to information presented by the visual code.

In another aspect, an embodiment of the present invention is directed to a method for making a plurality of asset tags. The method includes applying a plurality of visual codes to a first surface of a substrate, placing a plurality of radio frequency identification (RFID) devices storing unique information on a second surface of the substrate, each of the RFID transponders being disposed opposite to a respective visual code on the first surface, applying an adhesive material to the second surface of the substrate, separating the substrate into individual tags that each have one of the visual codes and the corresponding RFID transponder, and verifying that at least some of the unique information of each RFID transponder corresponds to the respective visual code found on the same individual tag as the RFID transponder.

In another aspect, an embodiment of the present invention is directed to a method of applying an asset identification tag having an adhesive region, an extension region, and an indicator located between the adhesive region and the extension region to an asset. The method includes folding the tag at the indicator so that the extension region is disposed over a first portion of the adhesive region and becomes secured to an adhesive located in the first portion of the adhesive region, aligning the tag so that the extension region extends from a peripheral edge of the asset, and applying a second portion of the adhesive region to a surface of the asset.

In another aspect, an embodiment of the present invention is directed to a method of applying an asset identification tag. The asset identification tag having an adhesive region, an extension region, and a transition region located between the adhesive region and the extension region to an asset. The method includes aligning the tag so that the extension region extends from a peripheral edge of the asset, confirming that the transition region is aligned with the peripheral edge of the asset, and applying at least a portion of the adhesive region to a first surface of the asset.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
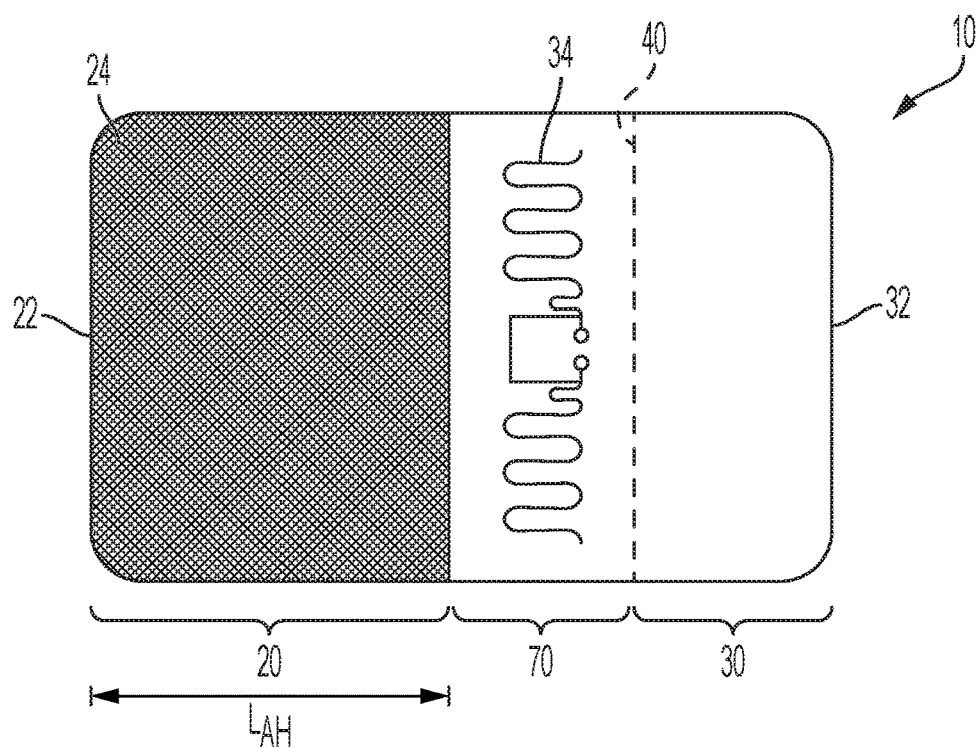
FIG. 1 is a bottom plan view of an asset tag in accordance with a first exemplary embodiment of the present invention, shown in an unfolded configuration.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2A:
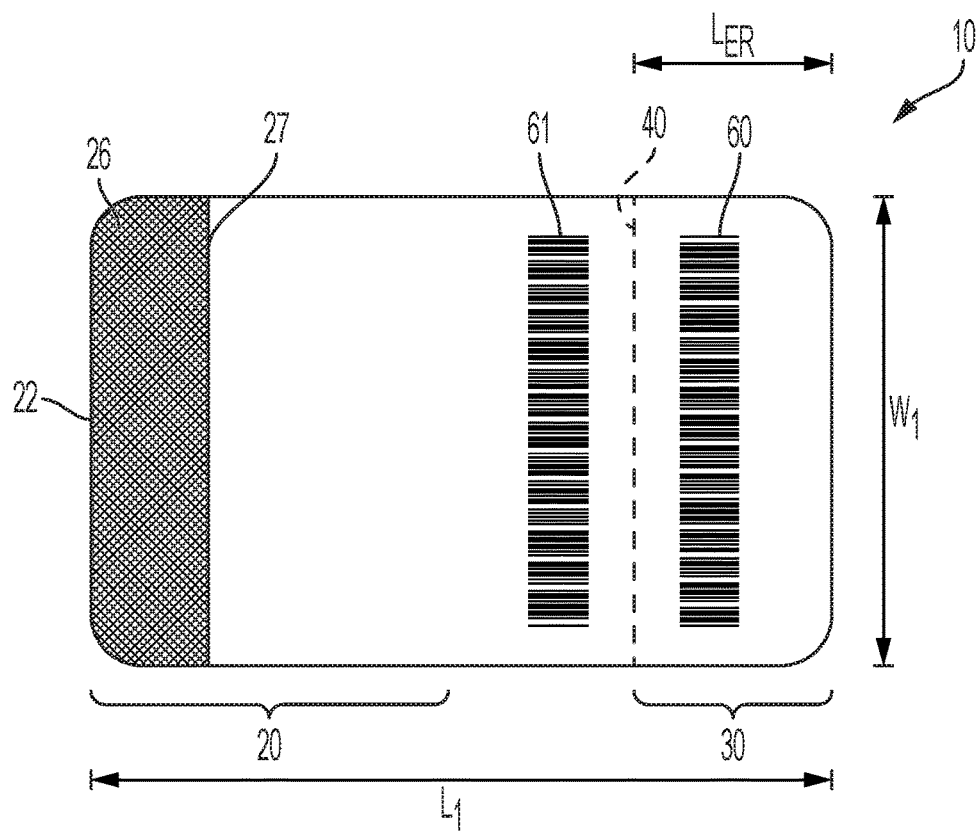
FIG. 2A is a top plan view of the asset tag of FIG. 1, shown in an unfolded configuration.
Figure 2B:
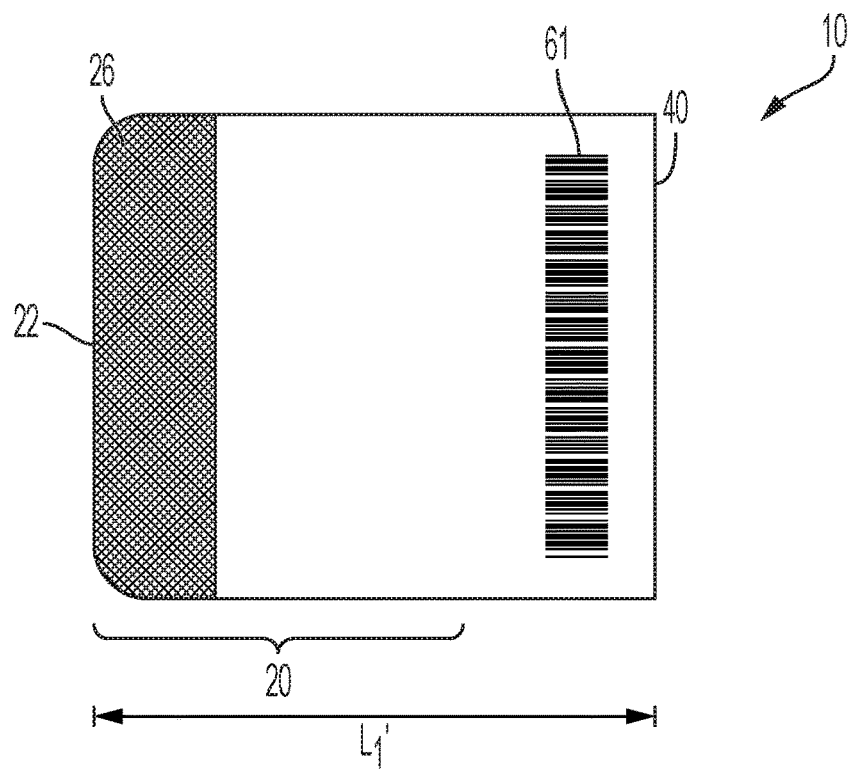
FIG. 2B is a top plan view of the asset tag of FIG. 1, shown in a folded configuration.
Figure 2C:
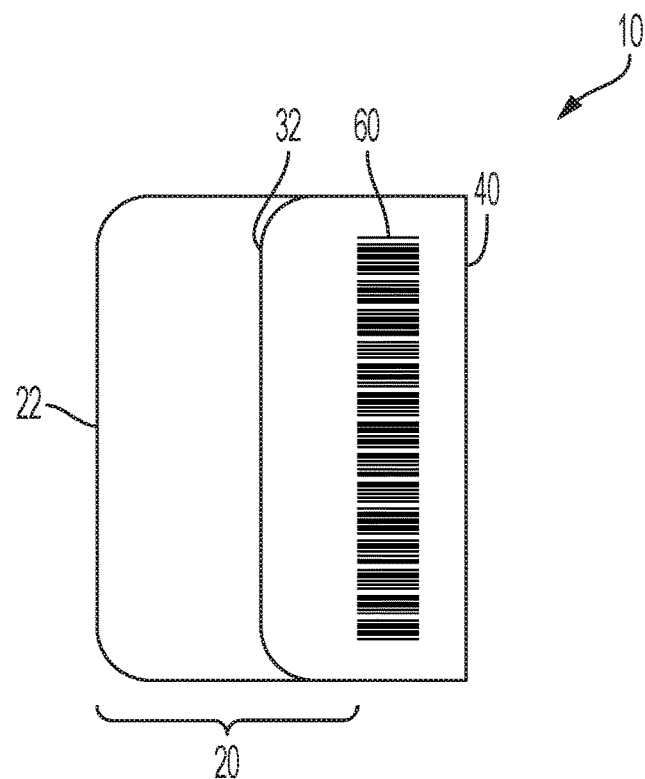
FIG. 2C is a bottom plan view of the asset tag of FIG. 1, shown in a folded configuration.

Referring to FIGS. 1-2C, one embodiment of the present invention is directed to an asset identification tag 10 preferably having an adhesive region 20 proximate a first end 22 of the asset identification tag 10. An adhesive 24, such as a double coated polyester tape with an acrylic adhesive, a double coated polyester tape with a high tack acrylic adhesive, a high strength acrylic adhesive, a polyester tape with a self-sealing acrylic adhesive, or the like, is preferably disposed on at least a portion of a surface of the adhesive region 20. The asset identification tag 10 also preferably has an extension region 30 proximate a second end 32 of the asset identification tag 10 opposite to the first end 22. The asset identification tag 10 further preferably has a central region 70 located between the adhesive region 20 and the extension region 30. An RFID transponder 34 is preferably disposed within the central region 70, but may also be located within the extension region 30. The RFID transponder 34 is preferably formed as a wet inlay, but is not so limited. While the RFID transponder 34 is shown on a surface of the central region 70 in FIG. 1, the RFID transponder 34 may alternatively be embedded within a material of the asset identification tag 10 or otherwise encapsulated. In addition, while an RFID transponder 34 is shown in the present embodiment, other types of wireless communication devices capable of transmitting a unique product identification code to a reader may be used as well, such as a near-field communication (NFC) tag, or the like.

The asset identification tag 10 also preferably has an indicator 40 disposed between the extension region 30 and the adhesive region 20. The indicator 40 can be one of a perforation, printed mark, indentation, raised pattern, combinations thereof, or the like, which may take the shape of a solid line, a dashed line, a hash mark, a crosshair, a dotted line, one or more symbols, a discoloration, a registration mark, a score, or the like. However, any indication by which a user can distinguish between two regions of the asset identification tag 10 may be used in keeping with embodiments of the present invention. The indicator 40 may be visible to the user from one or more surfaces of the asset identification tag 10. For example, in FIGS. 1 and 2A, the indicator 40 is seen from both the top and bottom views. This may be accomplished by perforations through the asset identification tag 10, transparent material, matching opposed patterns formed on multiple surfaces of the asset identification tag 10, or the like.

The first exemplary embodiment of the asset identification tag 10 also preferably has a first visual code 60 formed on a surface of the extension region 30 and a second visual code 61 formed on a surface of the asset identification tag 10 outside of the extension region 30. For example, the second visual code 61 may be formed in the central region 70. In some other embodiments, the second visual code 61 may be formed in the adhesive region. The visual codes 60, 61 may be any type of visual marking that can uniquely identify an asset, such as a one-dimensional or a two-dimensional bar code, an alphanumeric code, or the like. Preferably, the first and second visual codes 60, 61 are machine readable. Where the RFID transponder 34 is provided on a surface of the asset identification tag 10, one or both of the visual codes 60, 61 may be provided on a different and/or opposing surface of the asset identification tag 10. For example, the RFID transponder 34 is shown in FIG. 1 on the bottom surface of the asset identification tag 10, while the visual codes 60, 61 are shown in FIG. 2A on the top surface of the asset identification tag 10. However, embodiments of the present invention do not preclude placement of the RFID transponder 34 and one or both of the visual codes 60, 61 on the same surface. The first visual code 60 and the second visual code 61 are preferably identical and preferably correlate with information stored within the RFID transponder 34 to uniquely identify the asset identification tag 10.

The asset identification tag 10 also preferably has a marking 26 with an edge 27 disposed on at least a portion of the extension region 20 to visually distinguish at least a portion of the extension region 20 from the remainder of the asset identification tag 10. The marking 26 may be formed by printing, indenting, perforation, application of an external mark (such as a sticker or the like), combinations thereof, or the like, and may take the form of an image, a symbol, a texture, a shape, a shading, a color, hashing, hatching, crosshairs, a pattern, or the like. Preferably, the marking 26 is a printed black bar formed on a surface of the asset identification tag 10 opposite to the surface bearing the adhesive 24. However, embodiments of the present invention do not preclude the marking 26 from appearing on multiple surfaces of the asset identification tag 10, including the surface with the adhesive. In one embodiment, the marking 26 is located proximate the first end 22 of the asset identification tag 10 and covers less than one half of the area of the extension region 20. Preferably, a length $L_1$ of the asset identification tag 10 in an unfolded configuration (e.g., FIG. 2A) is approximately 2.5 inches and a width $W_1$ of the asset identification tag 10 is approximately 2 inches. In a folded configuration (e.g., FIGS. 2B-2C), a length $L_1'$ of the asset identification tag 10 is preferably approximately 1.5 inches. Preferably, a length $L_{ER}$ of the extension region 30 is approximately 1 inch, and a length $L_{AH}$ of the adhesive region 20 is approximately 1 inch, which leaves approximately 0.5 inches between the adhesive and extension regions 20, 30 for the central region 70.

In use, the asset identification tag 10 is preferably configured to be folded at or proximate the indicator 40. When folded in this way (e.g., FIGS. 2B-2C), the first visual code 60 and the second visual code 61 are preferably situated so as to face opposite directions, such that one of the first visual code 60 and second visual code 61 can be seen by a user when looking at either exposed surface of the asset identification tag 10. When folded in this way, the extension region 30 preferably does not overlap with the marking 26. Instead, the extension region 30 preferably overlaps with a portion of the central region 70 (and as a result, the RFID transponder 34) and/or a portion of the adhesive region 20 that does not contain the marking 26. Further, in this folded configuration, the RFID transponder 34 is preferably disposed between the first visual code 60 and the second visual code 61. Further, in the exemplary embodiment shown in FIG. 2C, at least a portion of the extension region 30 overlaps with a portion of the adhesive 24 and is thus adhered to the adhesive region 20. When folded in this way, a portion of the adhesive 24 and adhesive region 20 remain exposed, as shown in FIG. 2C, so that a user may apply the remaining exposed adhesive 24 to an asset (not shown) for securing the asset identification tag 10 thereto. In this respect, the adhesive 24 preferably serves two functions: securing the folded-over extension region 30 to the remainder of the asset identification tag 10 and securing the asset identification tag 10 to the asset.

The asset identification tag 10 may be formed of any suitable material, but is preferably a generally flexible and substantially waterproof material. The asset identification tag 10 is also preferably formed of a generally antistatic material. In the first exemplary embodiment described above, the asset identification tag 10 is formed of at least one of a polymeric material, a synthetic fiber, or the like having the above-described flexible, waterproof, and antistatic properties. Preferably, the asset identification tag 10 is formed of Teslin® (TESLIN is a registered trademark of PPG Industries). The construction of the asset identification tag 10 allows the asset identification tag 10 to be used with assets that can be any material, including metallic materials, liquids, and containers configured to hold liquids, without risk of damaging the asset identification tag 10.

Figure 3:
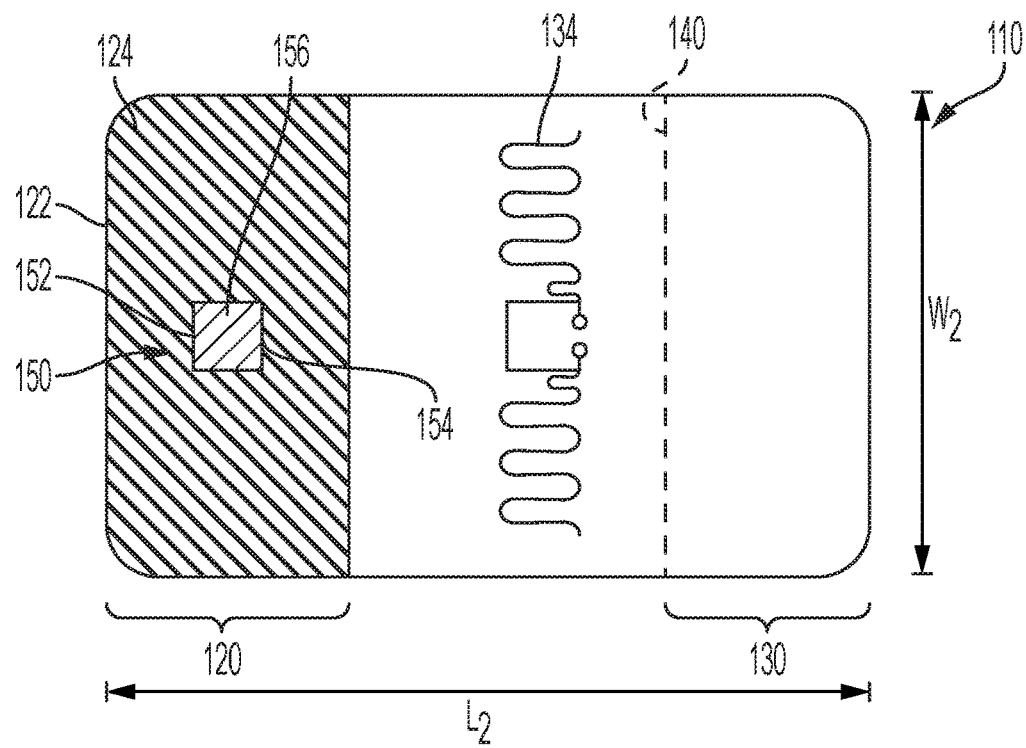
FIG. 3 is a bottom plan view of an asset tag in accordance with a second exemplary embodiment of the present invention, shown in an unfolded configuration.

Referring now to FIG. 3, a second exemplary embodiment of an asset identification tag, generally designated 110, is shown. Like reference numbers are utilized to identify like features of the second exemplary embodiment of the asset identification tag 110 when compared to the first asset identification tag 10, except the 100 series numerals have been used for the second embodiment. Accordingly, a complete description of the second embodiment has been omitted, with only the differences being described. The second exemplary embodiment of the asset identification tag 110 preferably has a tab 150 disposed in the adhesive region 120. The tab 150 preferably has a free end 152 and an attached end 154 that is secured to the asset identification tag 110. The free end 152 of the tab 150 preferably can be flexed away from the asset identification tag 110. The tab 150 is also at least partially coated with an adhesive 156. In the second exemplary embodiment of the asset identification tag 110, the attached end 154 of the tab 150 is of a unitary construction with the remainder of the asset identification tag 110, but may be perforated along the attached end 154. However, the tab 150 may alternatively be of a non-unitary construction with the remainder of the asset identification tag 110, or may not be perforated along the attached end 154. The attached end 154 may also be marked with a visual demarcation (not shown) such as a dashed line or the like. In use, a user may use the tab 150 to guide placement of the asset identification tag 110 on to an asset (not shown). The tab 150 is preferably disposed on the asset identification tag 110 such that when it is flexed away from the asset identification tag 110, it acts as a stopper against which a surface of the asset may be placed to ensure the asset identification tag 110 is placed at the correct depth on the asset.

Like in the first exemplary embodiment, preferably, a length $L_2$ of the second exemplary embodiment of the asset identification tag 110 is approximately 2.5 inches and a width $W_2$ of the second exemplary embodiment of the asset identification tag 10 is approximately 2 inches. However, neither the first nor the second exemplary embodiment is so limited, and each exemplary embodiment may have different dimensions than the other.

Figure 4:
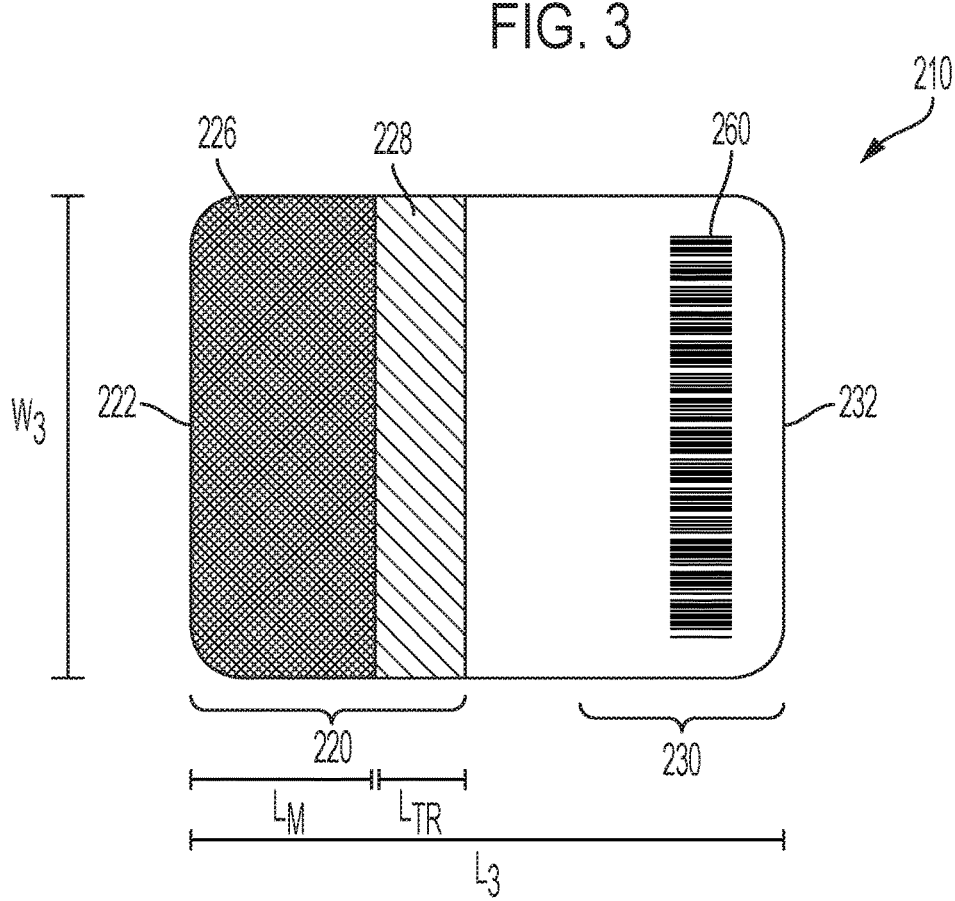
FIG. 4 is a top plan view of an asset tag in accordance with a third exemplary embodiment of the present invention.
Figure 5:
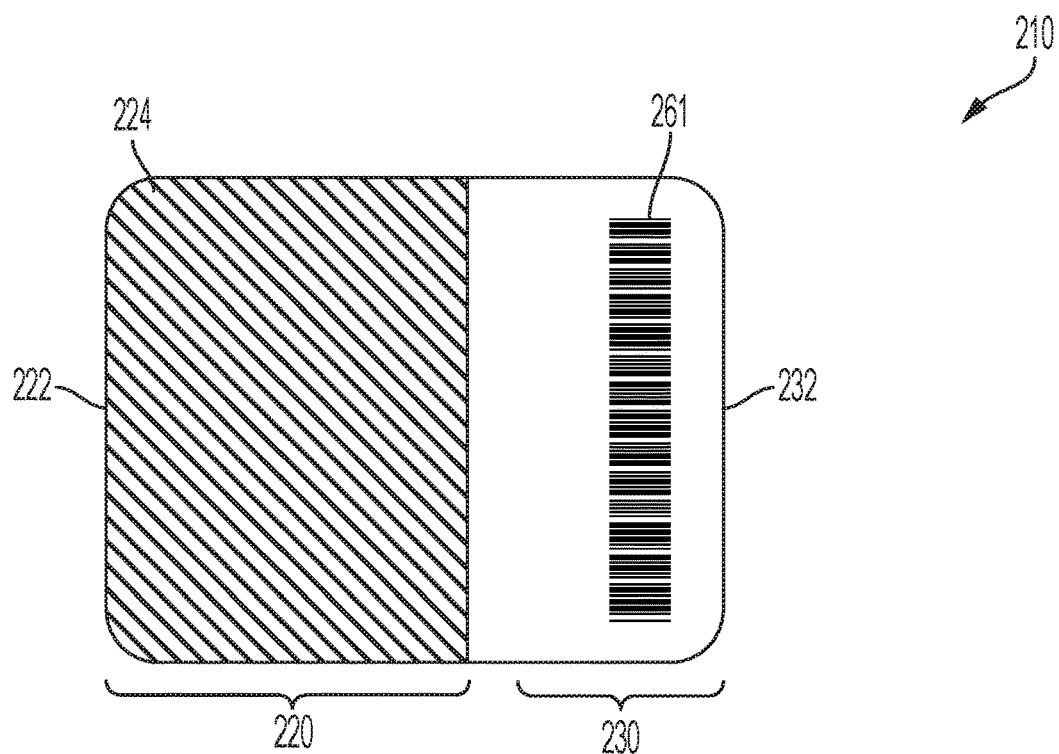
FIG. 5 is a bottom plan view of the asset tag of FIG. 4.
Figure 6:
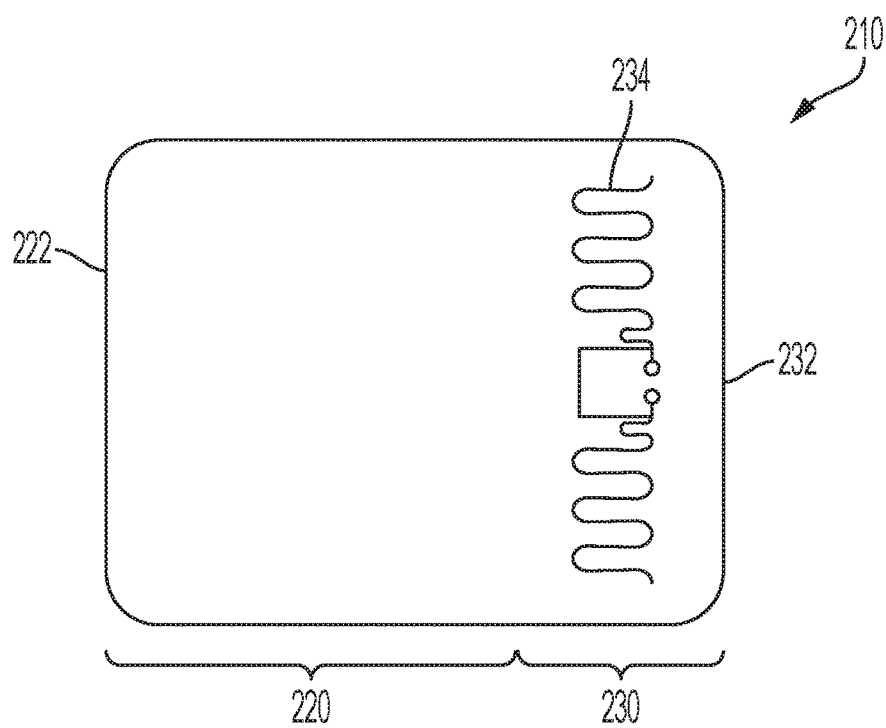
FIG. 6 is a schematic view of an interior of the asset tag of FIG. 4.

Referring now to FIGS. 4-6, a third exemplary embodiment of the present invention, generally designated 210, is shown. Like reference numbers are utilized to identify like features of the second embodiment of the asset identification tag 210 when compared to the first asset identification tag 10 and the second asset identification tag 110, except the 200 series numerals have been used for the third embodiment. Accordingly, a complete description of the third embodiment has been omitted, with only the differences being described. The third exemplary embodiment 210 preferably includes a transition region 228 disposed between the adhesive region 220 and the extension region 230. The transition region 228 is also preferably visually distinct from the extension region 230 and the adhesive region 220. The transition region 228 is not limited to any form and may therefore be any visual indication suitable for distinguishing between the regions of the asset identification tag 210, such as an image, a symbol, a texture, a shape, a shading, a color, hashing, hatching, crosshairs, a pattern, combinations thereof, or the like. As shown in FIG. 5, one surface of the tag 210 corresponding to the adhesive region 220 is coated with an adhesive 224. Preferably, the portion of the tag 210 coated with adhesive comprises a greater area than the extension region 230, but the invention is not so limited. The portion of the tag 210 coated with adhesive also preferably comprises a greater area than the transition region 228, but again, the invention is not so limited. The transition region 228 of the third exemplary embodiment 210 may be a gray bar, and the adhesive region also contains a marking 226, which may be a black bar.

In the third exemplary embodiment of the asset identification tag 210, the first visual code 260 and the second visual code 261 are disposed on opposing surfaces (e.g. top and bottom) of the asset identification tag 210, preferably on opposing surfaces of the extension region 230. As shown in FIG. 6, the RFID transponder 234 is disposed within the asset identification tag 210 in the extension region 230.

In the third exemplary embodiment, the asset identification tag 210 preferably has an overall length $L_3$ of approximately 1.75 inches and a width $W_3$ of approximately 2 inches. Further, the marking 226 has a length $L_M$ of approximately one-half inch, and the transition region 228 has a length $L_{TR}$ of approximately one-fourth of one inch.

Figure 7:
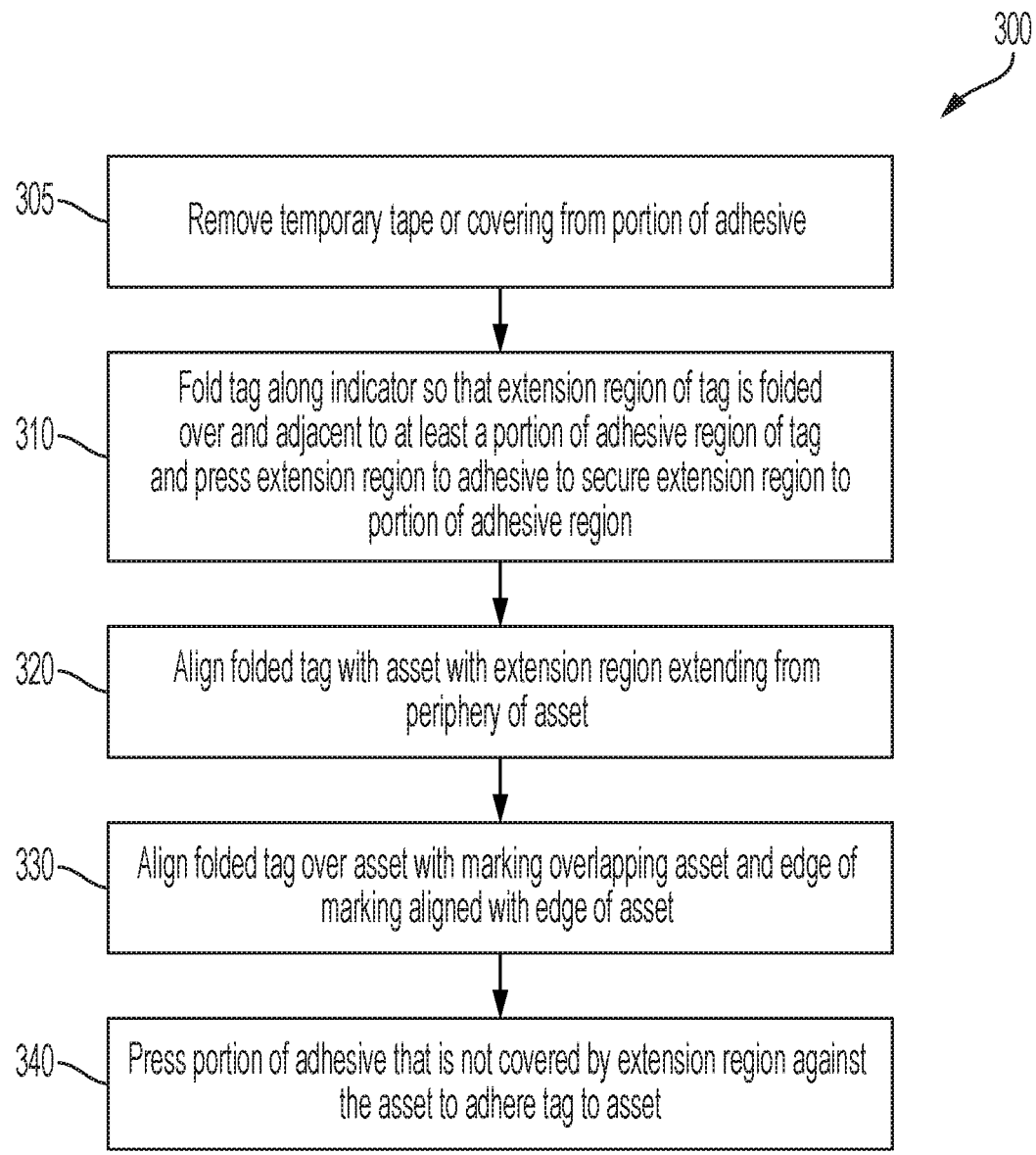
FIG. 7 is a flow chart showing a method of using the asset tag of FIG. 1.

Referring now to FIG. 7, an exemplary method 300 of using the first exemplary embodiment of the asset identification tag 10 is shown. The method includes a step 310 of folding the asset identification tag 10 along the indicator 40 so that the extension region 30 is folded over and adjacent to the remainder of the asset identification tag 10, including at least a portion of the adhesive region 20, and pressing the extension region 30 to the adhesive 24 so that the extension region 30 is secured to a portion of the adhesive region 20. The method further includes a step 320 of aligning the folded asset identification tag 10 with an asset (not shown) so that the extension region 30 extends beyond a peripheral edge of the asset. For example, where the asset is a server, the extension region 30 may project beyond the edge of the server housing. The method also preferably includes a step 330 of further aligning the folded asset identification tag 10 on the asset such that the marking 26 overlaps the asset and the edge 27 of the marking 26 is aligned with the edge of the asset. The method then includes a step 340 of pressing the portion of the adhesive 24 and adhesive region 20 that is not covered by the extension region 30 against the asset, thereby adhering the asset identification tag 10 to the asset. The method may also include a preliminary step 305 of removing any temporary tape or covering (not shown) that may be present over the adhesive 24 prior to the performance of the step 310. Preferably, this preliminary step 305 includes peeling away only a portion of the temporary tape or covering to allow the folding of the asset identification tag 10 as described in step 310, while retaining the temporary tape or covering over the remainder of the adhesive 24 to preserve the integrity of the adhesive 24 until the user is ready to perform step 320. In this way, the asset identification tag 10 can be pre-folded and adhered to itself before being shipped to the location of the asset, which may save in the time needed to install the asset identification tag 10 in the field and the cost for skilled laborers to do so.

When applied in the exemplary method shown in FIG. 7, the first embodiment of the asset identification tag 10 presents several advantages over the prior art. First, when applied in the method shown in FIG. 7, the asset identification tag 10 is oriented such that the RFID transponder 34 extends away from the asset by a sufficient distance so that the asset does not cause interference with the signal from the RFID antenna 34. This allows the asset identification tag 10 to be placed on an asset of nearly any material, even if that material could interfere with electromagnetic radiation, such as a metal. Testing has demonstrated that reducing the distance by which the antenna 34 extends from the asset by as little as one-eighth of one inch can reduce the range of the RFID signal by as much as 50 percent. The first embodiment of the asset identification tag 10 contains a marking 26 to guide the user in correctly applying the asset identification tag 10 so that the antenna 34 extends outwardly from the asset by an appropriate distance.

An additional benefit is provided by the folding step 310. This allows the first embodiment of the asset identification tag 10 to be constructed of thinner materials. The first embodiment 10 may be constructed of a substrate as thin as 10-13 mils. By folding the asset identification tag 10 at the indicator 40, the RFID transponder 34 is then protected on both sides by the 10-13 mil substrate (for a total of about 25 mils), adding additional rigidity and protection to the RFID transponder 34 without increasing the thickness of the portion of the adhesive region 20 that adheres to the asset, which can remain only 10-13 mils thick. This allows the asset identification tag 10 to gain additional rigidity surrounding the RFID transponder 34 while being capable of insertion between exceptionally closely arranged assets.

Figure 8:
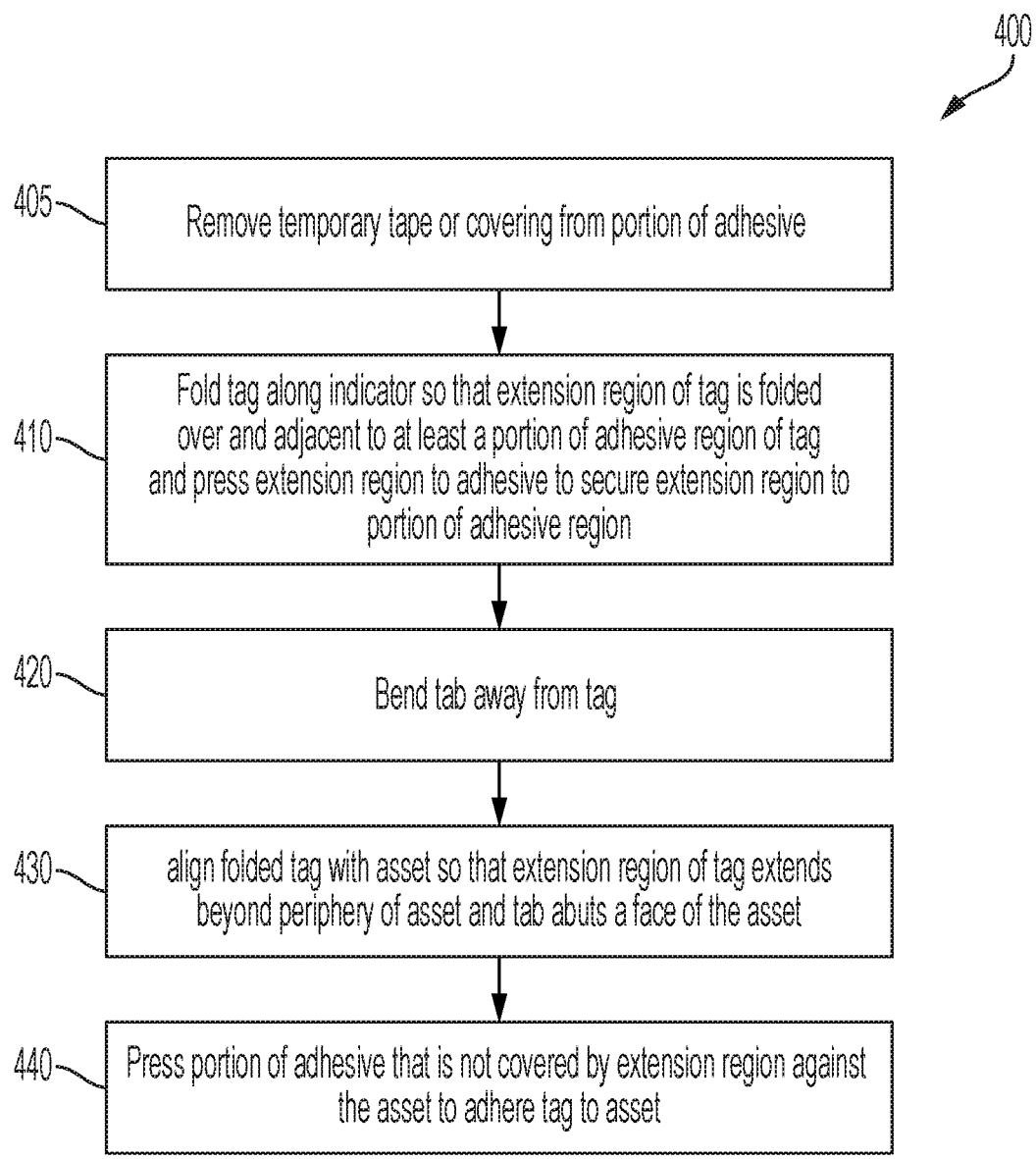
FIG. 8 is a flow chart showing a method of using the asset tag of FIG. 3.

Referring now to FIG. 8, an exemplary method 400 of using the second exemplary embodiment 110 is shown. The method of using the second exemplary embodiment 110 may include the preliminary step 405 of removing any temporary tape or covering (not shown) that may be present over the adhesive 124 prior to the performance of any other steps, as described above with respect to FIG. 7. The method shown in FIG. 8 also includes a step 410 of folding the asset identification tag 110 at the indicator 140 so that the extension region 130 is folded over and adjacent to the remainder of the asset identification tag 110, including at least a portion of the adhesive region 120, and pressing the extension region 130 to the adhesive 124 so that the extension region 130 is secured to a portion of the adhesive region 120. The method also includes a step 420 of bending the free end 152 of the tab 150 away from the asset identification tag 110. The method further includes a step 430 of aligning the folded asset identification tag 110 with an asset (not shown) so that the extension region 130 extends beyond the periphery of the asset and the tab 150 abuts a face of the asset. The method also includes a step 440 of pressing the portion of the adhesive 124 and adhesive region 120 that is not covered by the extension region 130 against the asset, thereby adhering the asset identification tag 110 to the asset. By following the method shown in FIG. 8, not only does the user obtain the advantages described above with respect to FIG. 7, but the tab 150 provides a further visual and/or tactile indicator of the proper placement of the asset identification tag 110 so that the signal of the RFID transponder 134 is not interfered with by the asset.

Figure 9:
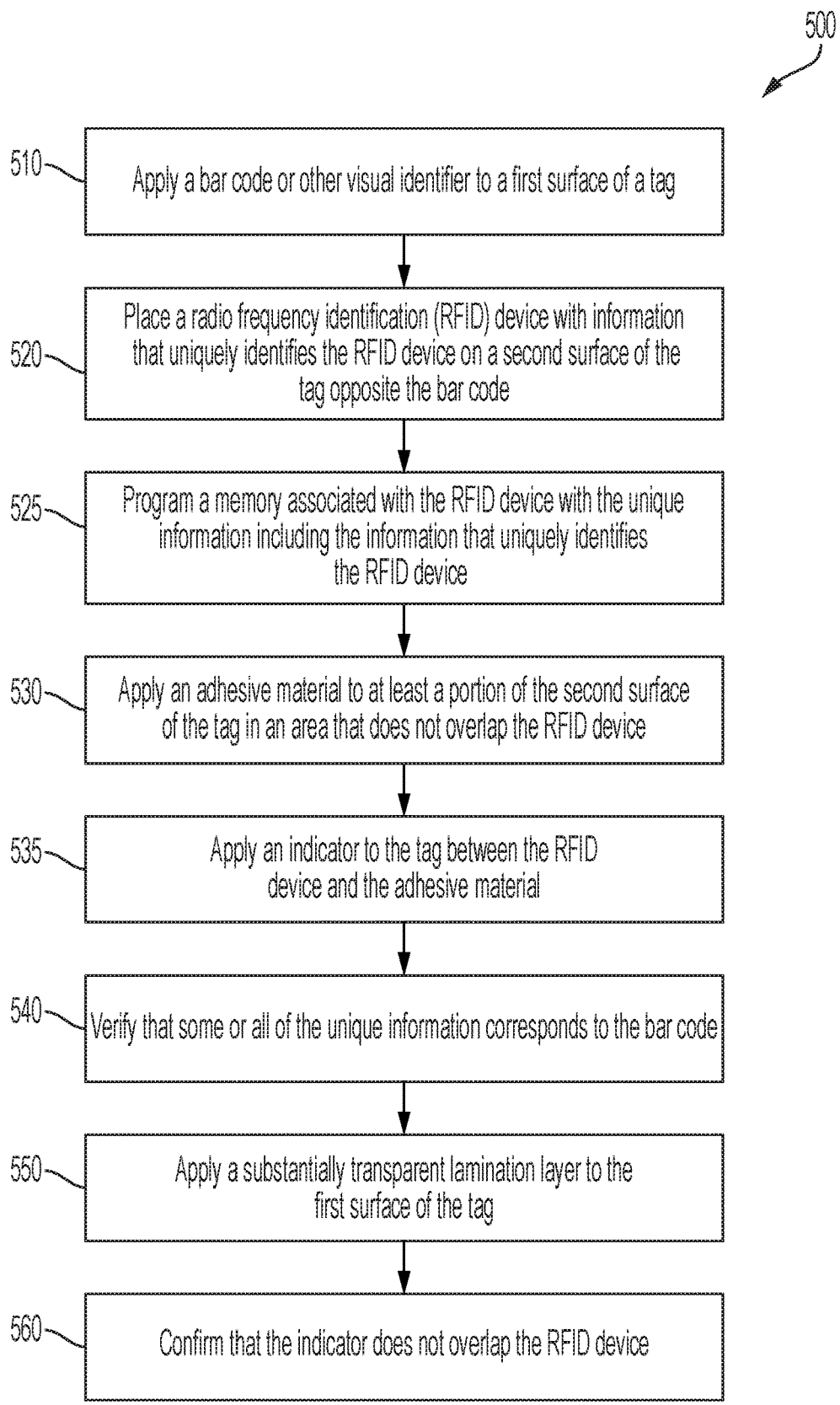
FIG. 9 is a flow chart showing a method of manufacturing an asset tag.

Referring to FIG. 9, another aspect of the present invention is directed to a method 500 for making an asset identification tag. The method preferably includes a step 510 of applying a visual code to a first surface of a tag, such as the asset identification tags 10, 110, 210 disclosed herein. The method also preferably includes a step 520 of placing an RFID (or other type of wireless communication) transponder to a second surface of the asset identification tag, preferably opposite the visual code. As explained above, the RFID transponder contains at least information that uniquely identifies the RFID transponder. The RFID transponder may have, be connected to, or be associated with a memory, which stores the unique information. The memory may be a tag identifier (TID) memory, an electronic product code (EPC) memory, or any other memory suitable for storing the unique information. The method may also include the step 525 of programming the memory with the unique information. The method further preferably includes a step 530 of applying an adhesive material to at least a portion of the second surface of the asset identification tag, preferably in an adhesive region that does not overlap with the RFID transponder. The method also preferably includes a step 535 of applying an indicator to the asset identification tag between an extension region where the RFID transponder is disposed and the adhesive region. The method also preferably includes a step 540 of, after the conclusion of steps 510 and 520, verifying that at least a portion of the unique information of the RFID transponder corresponds to the visual code. In use, this allows a user to identify an asset both by using the visual code and by using the RFID transponder. The method also preferably includes the step 550 of applying a substantially transparent lamination layer to the first surface of the asset identification tag. The method further preferably includes the step 560 of confirming that the indicator does not overlap the RFID transponder.

Figure 10:
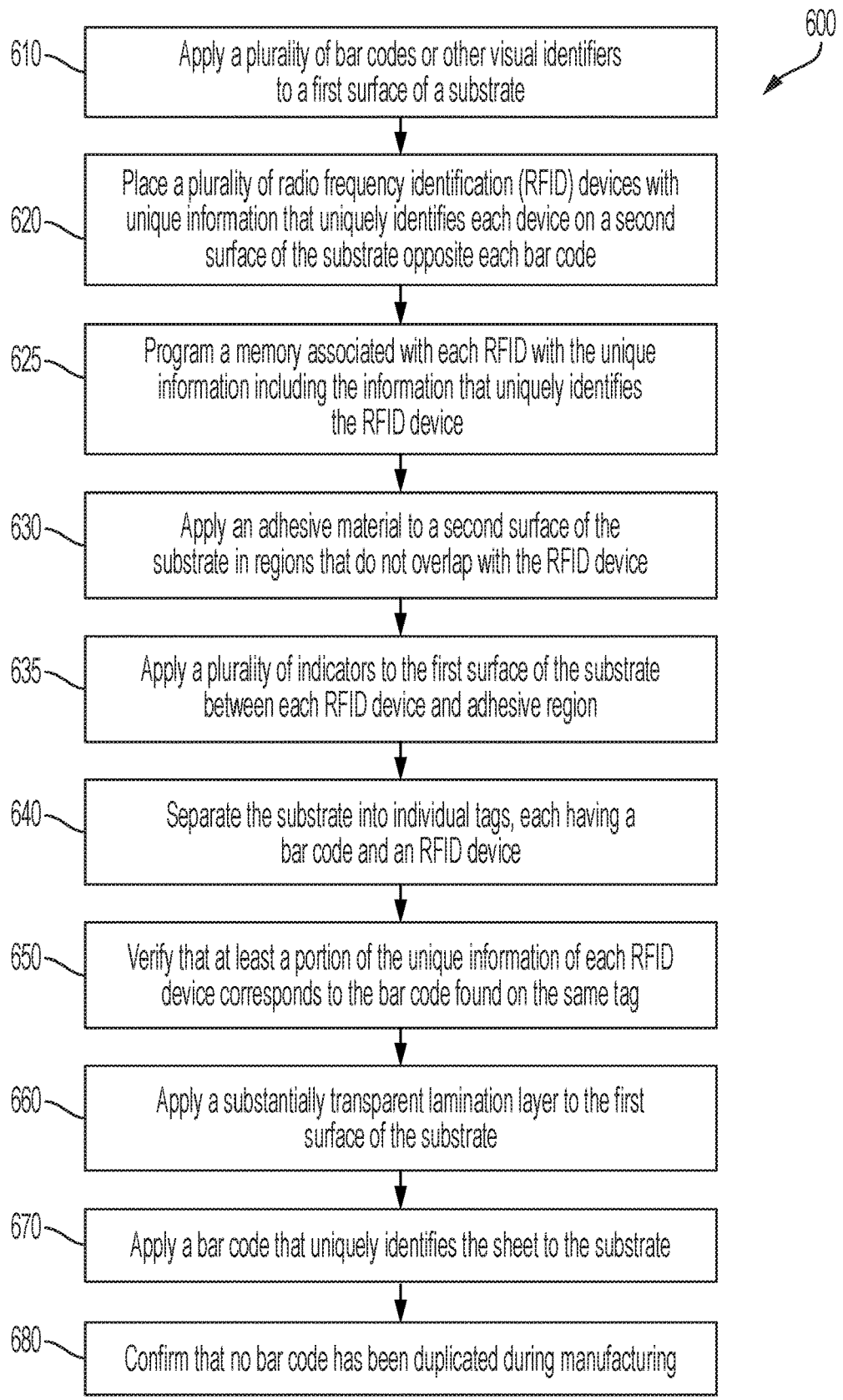
FIG. 10 is a flow chart showing a method of manufacturing a plurality of asset tags.

Referring now to FIG. 10, another aspect of the present invention is directed to a method 600 for making a plurality of asset identification tags, such as on a sheet. The method preferably includes a step 610 of applying a plurality of visual codes to a first surface of a substrate. The method also preferably includes a step 620 of placing a plurality of RFID transponders on a second surface of the substrate, with each RFID transponder being preferably located opposite to a respective visual code on the first surface. The RFID transponders preferably each store at least information that uniquely identifies the respective RFID transponder. Each RFID transponder may have or may be associated with a memory, which stores the unique information. The method further preferably includes a step 630 of applying an adhesive material to a second surface of the substrate, preferably in adhesive regions that do not overlap with the respective RFID transponders. The method also preferably includes a step 635 of applying a plurality of indicators to the first surface of the substrate, preferably between each RFID transponder and a corresponding respective adhesive region. The method further preferably includes a step 640 of separating the substrate into individual tags, each having its own visual code and RFID transponder. The method also preferably includes a step 650 of verifying that at least a portion of the unique information of each RFID transponder corresponds to the respective visual code found opposite the corresponding RFID transponder. The method also preferably includes the step 660 of applying a substantially transparent lamination layer to the first surface of the substrate, if applied before step 640, or to the first surface of each tag, if applied after step 640. The method further preferably includes a step 670 of applying a visual code that identifies the sheet to either surface of the substrate, and a further step 680 of confirming that no visual code has been duplicated in the manufacturing process.

Figure 11:
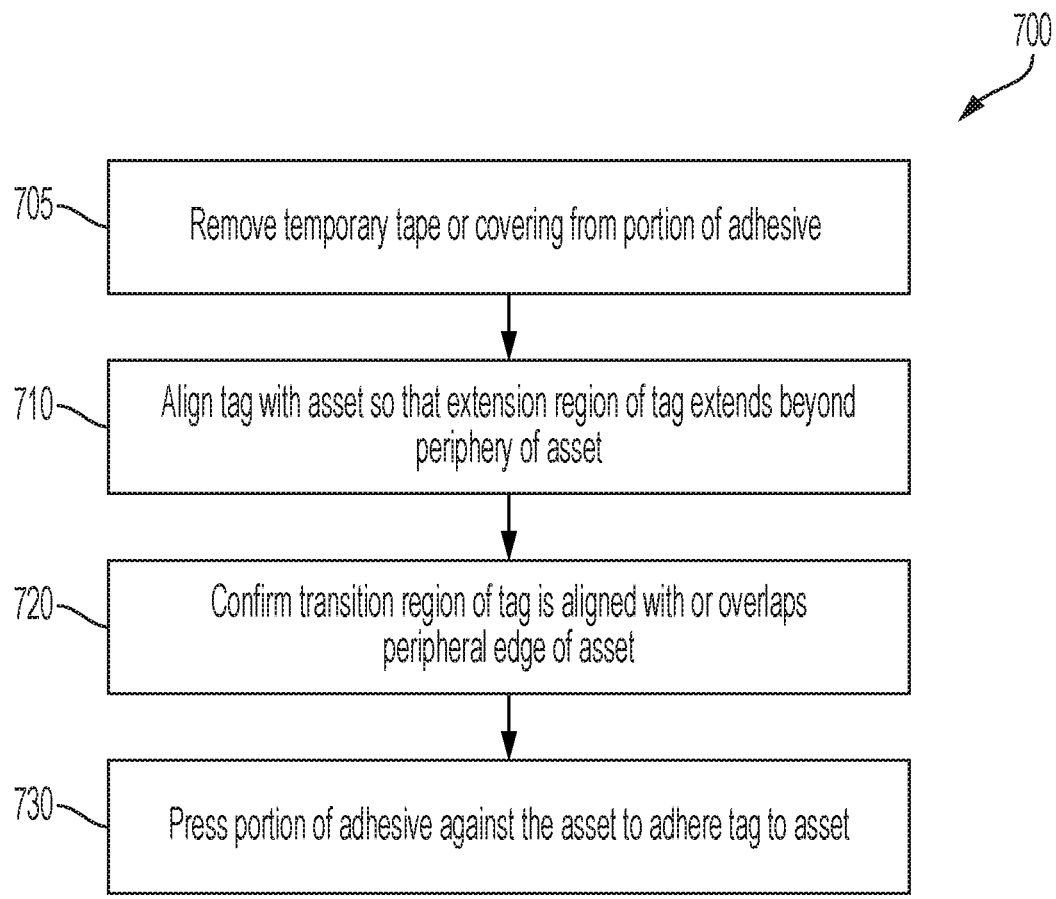
FIG. 11 is a flow chart showing a method of using the asset tag of FIG. 4.

Referring now to FIG. 11, an exemplary method 700 of using the third exemplary embodiment 210 is shown. The method of using the third exemplary embodiment 210 may include the preliminary step 705 of removing any temporary tape or covering (not shown) that may be present over an adhesive 224 prior to the performance of any other steps, as described above with respect to FIG. 7. The method shown in FIG. 11 also includes a step 710 of aligning the tag 210 so that the extension region 230 extends from a peripheral edge of the asset (not shown). The method further includes a step 720 of confirming that a transition region 228 of the tag 210 is aligned with or overlaps a peripheral edge of the asset (not shown). The method also includes a step 730 of applying at least a portion of an adhesive region 220 of the tag 210 to a first surface of the asset (not shown).

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. An asset identification tag comprising:
   an adhesive region proximate a first end of the tag, the adhesive region having an adhesive disposed on at least a portion of a surface thereof and a marking formed on at least a portion of the adhesive region to visually distinguish at least the portion of the adhesive region from a remainder of the tag;
   an extension region proximate a second end of the tag having a radio-frequency identification (RFID) transponder disposed within the extension region; and
   an indicator disposed between the extension region and the adhesive region.

2. The asset identification tag of claim 1, further comprising a first visual code formed on a surface of the extension region.

3. The asset identification tag of claim 2, further comprising a second visual code formed on a surface of the tag outside of the extension region.

4. The asset identification tag of claim 3, wherein the first visual code and second visual code are located so as to be opposite from one another when the tag is folded along the indicator.

5. The asset identification tag of claim 2, wherein the first visual code includes information corresponding to information stored within the RFID transponder.

6. The asset identification tag of claim 5, further comprising a second visual code formed on a surface of the tag outside of the extension region, wherein the second visual code includes information corresponding to the information included in the first visual code and the information stored within the RFID transponder.

7. The asset identification tag of claim 1, wherein the marking comprises a black bar.

8. The asset identification tag of claim 1, wherein the marking is one of an image, a symbol, a texture, a shape, a shading, a color, hashing, hatching, crosshairs, or a pattern.

9. The asset identification tag of claim 1, wherein an area of the marking is less than an area of the adhesive region.

10. The asset identification tag of claim 9, wherein the area of the marking is less than one half of the area of the adhesive region.

11. The asset identification tag of claim 1, wherein the tag is configured to be folded at or proximate the indicator.

12. The asset identification tag of claim 11, wherein when the tag is folded at or proximate the indicator, the extension region does not overlap with the marking.

13. The asset identification tag of claim 11, wherein when the tag is folded at or proximate the indicator, a portion of the extension region overlaps with a portion of the adhesive disposed on the surface of the adhesive region.

14. The asset identification tag of claim 13, wherein when the tag is folded at or proximate the indicator, the extension region overlaps with less than all of the adhesive disposed on the surface of the adhesive region.

15. The asset identification tag of claim 1, wherein the indicator is one of a perforation, a line, a dashed line, a hash mark, a crosshair, a dotted line, an indentation, a set of symbols, a discoloration, a registration mark, or a score.

16. The asset identification tag of claim 1, wherein the tag is formed of a generally flexible material.

17. The asset identification tag of claim 1, wherein the tag comprises at least one of a polymeric material, or a synthetic fiber.

18. The asset identification tag of claim 1, wherein the tag has a length of approximately 2.5 inches in an unfolded configuration, a length of approximately 1.5 inches in a folded configuration, and a width of approximately 2 inches.

19. An asset identification tag comprising:
   an adhesive region proximate a first end of the tag, the adhesive region having an adhesive disposed on at least a portion of a surface thereof and a tab portion disposed in the adhesive region, wherein the tab portion comprises a free end and an opposing attached end that is secured to the tag and wherein the free end of the tab can be flexed away from the tag;

an extension region proximate a second end of the tag having a radio-frequency identification (RFID) transponder disposed within the extension region; and an indicator disposed between the extension region and the adhesive region.

20. The asset identification tag of claim 19, further comprising:

a first visual code formed on a surface of the extension region; and a second visual code formed on a surface of the tag outside of the extension region;

wherein the first visual code and second visual code are located so as to be opposite from one another when the tag is folded along the indicator, wherein the first visual code includes information corresponding to information stored within the RFID transponder, and wherein the second visual code includes information corresponding to the information included in the first visual code and the information stored within the RFID transponder.

* * * * *